Dec. 28, 1948.  J. B. R. KILHOLM  2,457,381
IMPULSE TRANSMITTING APPARATUS
Filed Nov. 10, 1943  2 Sheets-Sheet 2
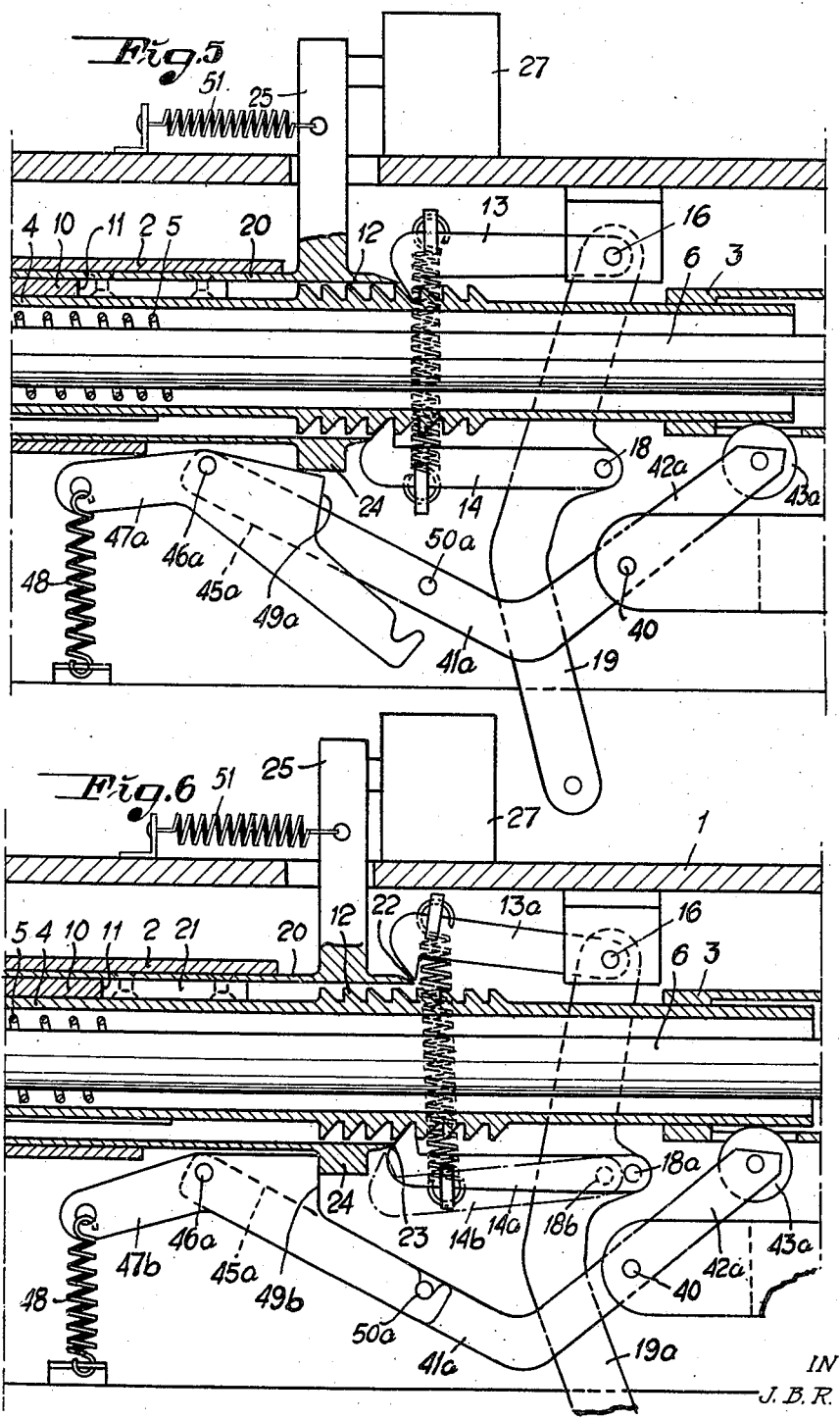
INVENTOR:
J. B. R. KILHOLM
BY Cushman, Darby & Cushman
ATTORNEYS Patented Dec. 28, 1948

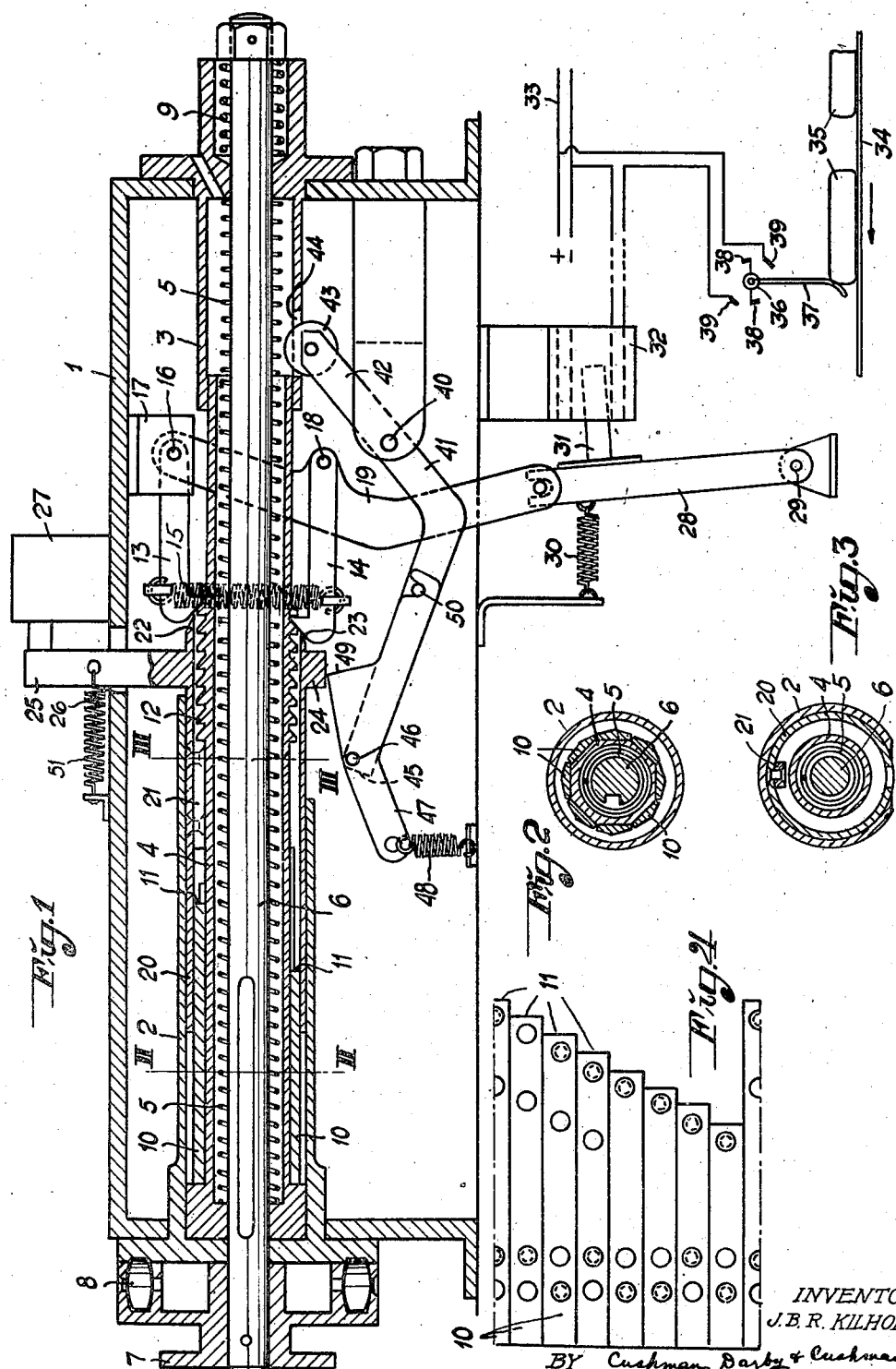

2,457,381

UNITED STATES PATENT OFFICE 2,457,381

IMPULSE TRANSMITTING APPARATUS

John Bertil Rudolf Kilholm, Koping, Sweden

Application November 10, 1943, Serial No. 509,812
In Sweden November 23, 1942

6 Claims. (Cl. 74—111)

This invention relates to an apparatus for transmitting impulses from travelling articles to an impulse receiver for actuating a deflecting or removing mechanism.

One object of my invention is to provide an apparatus which permits selection of certain predetermined impulses initiated by said travelling articles. A further object it to provide an apparatus which is adjustable during operation for varying said selection.

These and further objects are attained by mechanism illustrated in the accompanying drawings, in which:

Fig. 1 is a view in vertical section of a preferred embodiment of my invention; Fig. 2 is a section on the line II—II, Fig. 1; Fig. 3 is a section on the line III—III, Fig. 1; Fig. 4 is a diagrammatical view of a detail stretched out in a plane; Fig. 5 is a view similar to that shown in Fig. 1 with several parts in other positions; and Fig. 6 is a view with the parts in still another position.

The apparatus according to my invention may advantageously be used in conjunction with plants in which articles, such as cement-bags, paper-rolls, meal-bags, boxes or bottles travelling on a conveyer are to be actuated in an adjustable order. The embodiment illustrated in the drawings and described hereinbelow is particularly intended to give power impulses for removing or deflecting cement-bags from a conveyer band, the arrangement being such that each bag or every second, third, fourth, etc. bag can be removed from the conveyer according to the adjustment of the apparatus. In other words, the articles to be deflected or removed constitute elements of an arithmetical progression out of the series of articles travelling on the conveyer, the apparatus including means for arbitrarily determining the common difference of the arithmetical progression.

Referring to the drawings, the apparatus shown comprises a suitable casing 1 to which there are secured two coaxially arranged cylindrical guide members 2 and 3 located at opposite ends of the casing and adapted to guide a displaceable sleeve 4 in axial direction. A helical spring 5 tends to force the sleeve 4 to the starting position thereof, that is to the left-hand end position, as viewed in Fig. 1. The sleeve 4 is displaceable but not rotatably mounted on a shaft 6 which extends through the casing 1. By means of a handle 7, the shaft 6 is adjustable in eight different angular positions in which it is secured against unintended rotational movement by means of a resilient locking device comprising a number of small rollers 8 and a helical spring or similar resilient member 9. To the periphery of the sleeve 4, there are secured eight bars 10 (see also Figs. 2 and 4) the inner end faces of which are of different lengths and constitute abutting faces 11 disposed at equal axial distances from each other. The sleeve 4 is further provided with eight annular teeth 12 arranged at equal distances from each other, the distance between consecutive teeth 12 being equal to the axial distance between consecutive abutting faces 11 of the bars 10.

The teeth 12 are adapted to cooperate with two pawls 13 and 14 which are actuated by a common helical spring 15 tending to force the pawls inwardly, that is into engagement with the teeth 12. The pawl 13 is pivotally mounted on a pin 16 mounted in a bracket 17 secured to the casing 1. The other pawl 14 is pivotally mounted on a pin 18 which is connected with a lever 19 pivotally mounted on the pin 16. As will be seen from Figs. 1 and 5, the pawl 13 mounted on the pin 16 is arranged to engage a tooth which, as viewed in the forward direction, that is from the left towards the right in Fig. 1, is located ahead of that tooth which is simultaneously cooperating with the other pawl 14.

A sleeve 20 disposed concentrically with respect to and outwardly of the sleeve 4 is also displaceable in axial direction and is on its inner side provided with an abutting member 21 (Fig. 3) intended to cooperate with any of the abutting faces 11. At the end directed towards the pawls 13 and 14, the sleeve 20 is provided with bevelled faces 22 and 23, shaped in a manner such that at a relative movement between the sleeve 20 and either of the pawls said faces will constitute guide faces for the respective pawl such that the pawl can slide outwardly on the guide face so as to be brought out of engagement with the tooth. The sleeve 20 further has a downwardly projecting stop 24 and a rigid arm 25 which extends upwardly through an opening 26 in the casing 1. Upon displacement of the sleeve 20 towards the right as viewed in Fig. 1, the arm 25 acts upon an impulse receiver. In the present instance, the arm 25 closes a resilient switch 27 diagrammatically indicated in Fig. 1. The switch 27 is acted upon by a spring 51 and adapted to operate a deflecting mechanism which is not shown in the drawing, since it forms no object of this invention.

The lever 19 is pivotally connected with an arm 28 adapted to be swung about a fixed pivot 29.

The arm 28 is acted upon by a helical spring 30 and by the core 31 of a solenoid 32 which can be energized by a suitable source of current 33.

In Fig. 1, there is also shown, in a diagrammatical manner and on a reduced scale, an impulse initiating mechanism and a conveyer band 34 for bags or similar articles 35. The impulse initiating mechanism comprises a tongue 37 freely depending from a horizontal pivot 36 and provided with contacts 38 for cooperation with two contacts 39 provided in the circuit of the solenoid 32.

A two-armed lever 41 pivoted at 40 is at the end of one arm 42 provided with a roller 43 which in the position shown in Fig. 1 to some extent projects through an opening 44 in the guide member 3. On the other arm 45 of the lever 41 there is mounted a second two-armed lever 47 pivoted at 46. One arm of the lever 47 is subject to the action of a helical spring 48. The lever 47 has an abutting face 49 intended to cooperate with the stop 24 on the sleeve 20. A pin 50 secured to the lever 41 limits the movement of the lever 47 relative to the lever 41 in an anticlockwise direction, as viewed in Fig. 1.

The mode of operation of the apparatus described is as follows.

In Fig. 1, the various parts are shown in their original or starting positions. The apparatus is adjusted such that every fourth of the bags 35 travelling on the conveyer band 34 will be removed from the conveyer band by means of a deflecting mechanism not shown in the drawing. To this end, the sleeve 4 is assumed to be adjusted, by means of the handle 7, into such an angular position, that the bar 10, the abutting face 11 of which is located at an axial distance of three steps from the left-hand end face of the abutting member 21, is disposed in the same radial plane as the abutting member 21, the term "step" indicating the axial distance between two consecutive teeth 12 or abutting faces 11.

When the first bag 35 of a series of bags is travelling below the tongue 37, the tongue will be swung in a clockwise direction, as viewed in Fig. 1. As a result thereof, the contacts 38 and 39 will be engaged so as to energize the solenoid 32 which will attract the core 31. The arm 28 will be swung in a clockwise direction against the resistance of the spring 30 with the result that the lever 19 will be swung in a counter-clockwise direction about the pivot 16. The lever 19 will be swung through such an angle that the pivot 18 of the pawl 14 will be moved to the right, as viewed in Fig. 1, by a distance equal to one step, that is equal to the axial distance between consecutive teeth 12 or abutting faces 11. Consequently, the sleeve 4 will be moved one step to the right, whereupon the pawl 13 will engage the following tooth and thereby prevent the sleeve 4 from returning to the original or starting position. When the first bag 35 has entirely passed beyond the tongue 37, the tongue will swing downwardly with the result that the electric current will be broken and the arm 28 and the lever 19 returned to the positions shown in Fig. 1 by means of the spring 30. At that time, the pawl 14 will engage the following tooth.

The operation described will be repeated when the second and the third bags are travelling under and beyond the tongue 37. Before the fourth bag comes into contact with the tongue, the pawls 13 and 14 and the sleeve 20 will be in the positions shown in Fig. 5. In this position, the abutting face 11 is almost or entirely in contact with the abutting member 21.

During the displacement of the sleeve 4, the right-hand end of the sleeve has forced downwardly the roller 43 with the result that the levers 41 and 47 now will assume the positions indicated at 41a and 47a, respectively (Fig. 5), the spring 48 being tensioned.

When the fourth bag actuates the contact device 38, 39, the lever 19 will be moved to the position indicated at 19a in Fig. 6. The sleeve 4 will be moved a further step and thereby force, by means of the bar 10 and the abutting member 21, the sleeve 20, the stop 24 connected therewith and the arm 25 to the right into the positions shown in Fig. 6. In this position, the arm 25 closes the switch 27 and thereby starts the deflecting mechanism for removing the fourth bag of the series from the conveyer band.

Upon displacement of the sleeves 20 and 4, the pawl 13 will be disengaged from the cooperating tooth by means of the bevelled face 22 and will be moved into the position denoted at 13a. To begin with, the pawl 14 is in the position indicated at 14a. When the circuit of the solenoid 32 is opened, and, consequently, the pivot 18 of the pawl 14 is returned from the position indicated at 18a to the position indicated at 18b, the pawl 14, too, will, by means of the bevelled face 23, be disengaged from the cooperating tooth and will be moved into the position indicated at 14b. This is necessary in order to render possible the return movement of the sleeve 4 under the action of the spring 5 into the starting position shown in Fig. 1. In order that the pawl 14 shall be enabled to slide outwardly on the bevelled face 23, and in order that both of the pawls shall be kept out of engagement with the corresponding teeth during the return movement of the sleeve 4, the sleeve 20 must be prevented, during the return movement of the sleeve 4, from being returned to the position shown in Figs. 1 and 5. This condition is attained by means of the abutting face 49 which upon displacement of the sleeve 20 into the position shown in Fig. 6 will be brought, by means of the spring 48, into engagement with the stop 24 and thereby retain the sleeve 20 during the return movement of the sleeve 4 into the original position. In this position, the lever 47 and the abutting face 49 are in the positions indicated at 47b and 49b, respectively.

When the sleeve 4 has been returned into the starting position, the roller 43 can be moved inwardly through the opening 44 under the action of the spring 48. As a result thereof, the abutting face 49 is disengaged from the stop 24, and all parts of the apparatus will assume the original position shown in Fig. 1.

The invention is obviously not limited to the embodiment shown and described by way of example, but may be modified in various manners within the scope of the appended claims.

What I claim is:

1. An impulse transmitting apparatus, comprising a mechanism for initiating a series of impulses, an impulse receiver, a movable ratchet member adjustable in a starting position, a pivotally mounted lever, means for transforming impulses from said initiating mechanism into rocking movements of said lever, a first spring-loaded pawl pivotally mounted on said lever for imparting a series of forward steps to said ratchet member, a spring device tending to force said ratchet member into its starting position, a second spring-loaded pawl constructed to prevent said ratchet member from returning towards said starting position, a control device for determining the number of said forward steps, a slidable member adapted to be actuated by said control device during the last forward step of said ratchet member for energizing said impulse receiver, and a releasing device adapted to be actuated by said slidable member for disengaging said pawls from said ratchet member, whereby to permit said ratchet member to return to its starting position.

2. An impulse transmitting apparatus, comprising a mechanism for initiating a series of impulses, an impulse receiver, a movable ratchet member adjustable in a starting position, a pivotally mounted lever, means for transforming impulses from said initiating mechanism into rocking movements of said lever, a first spring-loaded pawl pivotally mounted on said lever for imparting a series of forward steps to said ratchet member, a spring device tending to force said ratchet member into its starting position, a second springloaded pawl constructed to prevent said ratchet member from returning towards said starting position, a control device for determining the number of said forward steps, a slidable member adapted to be actuated by said control device during the last forward step of said ratchet member for energizing said impulse receiver, a first releasing mechanism associated with said slidable member for disengaging said first pawl from said ratchet member after the last forward step of said ratchet member, and a second releasing mechanism associated with said slidable member for disengaging said second pawl from said ratchet member during the last forward step of said ratchet member, whereby to permit said ratchet member to return to its starting position.

3. An impulse transmitting apparatus, comprising a mechanism for initiating a series of impulses, an impulse receiver, a movable ratchet member adjustable in a starting position, a pivotally mounted lever, means for transforming impulses from said initiating mechanism into rocking movements of said lever, a first springloaded pawl pivotally mounted on said lever for imparting a series of forward steps to said ratchet member, a first spring device tending to force said ratchet member into its starting position, a second springloaded pawl constructed to prevent said ratchet member from returning towards said starting position, a control device, means for adjusting the control device during the operation of said apparatus for determining the number of said forward steps, a slidable member adapted to be actuated by said control device during the last forward step of said ratchet member for energizing said impulse receiver, a first releasing mechanism associated with said slidable member for disengaging said first pawl from said ratchet member after the last forward step of said ratchet member, a second releasing mechanism associated with said slidable member for disengaging said second pawl from said ratchet member during the last forward step of said ratchet member, whereby to permit said ratchet member to return to its starting position, a second spring device tending to force said releasing mechanisms into inoperative positions, and a catch device for keeping said releasing mechanisms in operative positions during the return movement of said ratchet member.

4. An impulse transmitting apparatus, comprising a mechanism for initiating a series of impulses, an impulse receiver, a movable ratchet member adjustable in a starting position, a pivotally mounted lever, means for transforming impulses from said initiating mechanism into rocking movements of said lever, a first spring-loaded pawl pivotally mounted on said lever for imparting a series of forward steps to said ratchet member, a spring device tending to force said ratchet member into its starting position, a second spring-loaded pawl constructed to prevent said ratchet member from returning towards said starting position, a plurality of movable control members secured to said ratchet member and having working faces equally interspaced in the moving direction of said ratchet member, the distance between consecutive working faces being equal to the length of one step of said ratchet member, a slidable member, an abutting member secured to said slidable member and adapted to be actuated by one of said control members, selecting means adjustable during the operation of said apparatus for selecting one of said control members for engagement with said abutting member, whereby to determine the number of forward steps of said ratchet member, said slidable member being arranged to energize said impulse receiver upon engagement between said abutting member and said selected control member, and a releasing device adapted to be actuated by said slidable member for disengaging said pawls from said ratchet member, whereby to permit said ratchet member to return to its starting position.

5. An impulse transmitting apparatus, comprising a mechanism for initiating a series of impulses, an impulse receiver, a movable ratchet member adjustable in a starting position, a pivotally mounted first lever, means for transforming impulses from said initiating mechanism into rocking movements of said first lever, a first springloaded pawl pivotally mounted on said first lever for imparting a series of forward steps to said ratchet member, a first spring device tending to force said ratchet member into its starting position, a second springloaded pawl constructed to prevent said ratchet member from returning towards said starting position, a control device for determining the number of said forward steps, a slidable member adapted to be actuated by said control device during the last forward step of said ratchet member for energizing said impulse receiver, a first releasing mechanism associated with said slidable member for disengaging said first pawl from said ratchet member after the last forward step of said ratchet member, a second releasing mechanism associated with said slidable member for disengaging said second pawl from said ratchet member during the last forward step of said ratchet member, whereby to permit said ratchet member to return to its starting position, a second spring device tending to force said releasing mechanisms into inoperative positions, a stop member secured to said slidable member, a pivotally mounted second lever movable in response to the first step of said ratchet member, and a click device associated with said second lever and ready for engagement with said stop member after said first step of said ratchet member, said click device being arranged to engage said stop member at the last step of said ratchet member.

6. An impulse transmitting apparatus, comprising a mechanism for initiating a series of impulses, an impulse receiver, a movable ratchet sleeve adjustable in a starting position and provided with a plurality of annular teeth, a pivotally mounted lever, means for transforming impulses from said initiating mechanism into rocking movements of said lever, a first springloaded pawl pivotally mounted on said lever for imparting a series of forward steps to said ratchet sleeve, a first spring device tending to force said ratchet sleeve into its starting position, a second springloaded pawl constructed to prevent said ratchet sleeve from returning towards said starting position, a plurality of bars secured to the periphery of said ratchet sleeve and having end faces disposed at equal axial distances from each other, the axial distance between consecutive end faces being equal to the length of one step of said ratchet sleeve, a slidable sleeve disposed concentrically with respect to and outwardly of said ratchet sleeve, an abutting member secured to the inside of said slidable sleeve and adapted to be actuated by one of said bar end faces, a handle for adjusting said ratchet sleeve into different angular positions, whereby to select one of said bars for engagement with said abutting member, a first bevelled face provided on the end of said slidable sleeve directed towards said pawls for disengaging said first pawl from said ratchet sleeve after the forward movement of said slidable sleeve upon the engagement between said abutting member and said selected bar, a second bevelled face provided on the end of said slidable sleeve directed towards said pawls for disengaging said second pawl during said forward movement of said slidable sleeve, a second spring device tending to force said slidable sleeve backwards, a stop member projecting from and secured to said slidable sleeve, cam means secured to said ratchet sleeve, a pivotally mounted first two-armed lever one arm of which is adapted to be actuated by said cam means during the first forward step of said ratchet sleeve, a second two-armed lever pivotally mounted on the other arm of said first two-armed lever and having an abutting face ready for engagement with said projecting stop member upon the engagement between said cam means and said first two-armed lever, said abutting face being arranged to retain said slidable sleeve in the forward end position thereof, a third spring device tending to force said abutting face and said cam actuated lever arm into engagement with said stop member and said cam means, respectively, means secured to said first two-armed lever for limiting the movement of said second two-armed lever relative to said first two-armed lever due to the action of said third spring device, and means associated with said slidable sleeve for energizing said impulse receiver at the forward movement of said slidable sleeve.

JOHN BERTIL RUDOLF KILHOLM.

REFERENCES CITED

The following references are of record in the file of this patent:

UNITED STATES PATENTS

| Number | Name | Date |
| --- | --- | --- |
| 987,727 | Lee | Mar. 28, 1911 |
| 1,841,711 | Cannon | Jan. 19, 1932 |
| 1,881,514 | Keller et al. | Oct. 11, 1932 |
| 2,087,039 | McMaster | July 13, 1937 |
| 2,122,710 | Bidwell et al. | July 5, 1938 |
| 2,266,862 | Hardey | Dec. 23, 1941 |
| 2,346,869 | Poole | Apr. 18, 1944 |